(12) United States Patent
Hasegawa et al.

(10) Patent No.: US 10,211,445 B2
(45) Date of Patent: Feb. 19, 2019

(54) LEAD-ACID BATTERY

(71) Applicant: GS Yuasa International Ltd., Kyoto-shi, Kyoto (JP)

(72) Inventors: Mikihito Hasegawa, Shizuoka (JP); Shinsuke Oki, Shizuoka (JP); Yu Kojima, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 91 days.

(21) Appl. No.: 15/509,275

(22) PCT Filed: Aug. 5, 2015

(86) PCT No.: PCT/JP2015/003930
§ 371 (c)(1),
(2) Date: Mar. 7, 2017

(87) PCT Pub. No.: WO2016/038786
PCT Pub. Date: Mar. 17, 2016

(65) Prior Publication Data
US 2017/0263913 A1    Sep. 14, 2017

(30) Foreign Application Priority Data

Sep. 9, 2014  (JP) .................................. 2014-182968
Sep. 12, 2014  (JP) .................................. 2014-185906

(51) Int. Cl.
*H01M 2/02* (2006.01)
*H01M 2/04* (2006.01)
(Continued)

(52) U.S. Cl.
CPC ........... *H01M 2/307* (2013.01); *H01M 2/024* (2013.01); *H01M 2/0242* (2013.01);
(Continued)

(58) Field of Classification Search
CPC .................................................... H01M 2/307
See application file for complete search history.

(56) References Cited

U.S. PATENT DOCUMENTS 6,030,723 A * 2/2000 Nagano ................ H01M 2/307
429/178
2011/0039153 A1    2/2011 Nakayama

FOREIGN PATENT DOCUMENTS

CN    102017235 A    4/2011
JP    60168264    11/1985
(Continued)

OTHER PUBLICATIONS

International Search Report dated Oct. 13, 2015 filed in PCT/JP2015/003930.

*Primary Examiner* — Maria Laios
(74) *Attorney, Agent, or Firm* — Rankin, Hill & Clark LLP

(57) ABSTRACT

A lead-acid battery includes an electrode plate assembly, a battery case, a positive electrode strap, a negative electrode strap, a positive electrode post, a negative electrode post, a cover, and an electrolyte solution. A negative electrode bushing provided in the cover and the negative electrode post together constitute a negative electrode terminal. A maximum value of a gap between an outer circumferential surface of the negative electrode post and an inner circumferential surface of the negative electrode bushing in the negative electrode terminal is 0.5 mm or more and 2.5 mm or less. A rib is provided in a lower part of the negative electrode bushing, and a minimum value of a protrusion height of the rib is 1.5 mm or more and 4.0 mm or less. A distance between a surface of the electrolyte solution and a lowermost portion of the negative electrode bushing is 15 mm or less.

5 Claims, 2 Drawing Sheets

(51) Int. Cl.
| | |
|---|---|
| *H01M 2/06* | (2006.01) |
| *H01M 2/16* | (2006.01) |
| *H01M 2/18* | (2006.01) |
| *H01M 2/28* | (2006.01) |
| *H01M 2/30* | (2006.01) |
| *H01M 4/21* | (2006.01) |
| *H01M 4/56* | (2006.01) |
| *H01M 4/68* | (2006.01) |
| *H01M 10/06* | (2006.01) |
| *H01M 10/08* | (2006.01) |
| *H01M 10/14* | (2006.01) |

(52) U.S. Cl.
CPC .............. *H01M 2/043* (2013.01); *H01M 2/06* (2013.01); *H01M 2/1653* (2013.01); *H01M 2/18* (2013.01); *H01M 2/28* (2013.01); *H01M 4/21* (2013.01); *H01M 4/56* (2013.01); *H01M 4/685* (2013.01); *H01M 10/06* (2013.01); *H01M 10/08* (2013.01); *H01M 10/14* (2013.01); *H01M 2220/20* (2013.01); *H01M 2300/0011* (2013.01); *Y02E 60/126* (2013.01)

(56) References Cited

FOREIGN PATENT DOCUMENTS

| | | | |
|---|---|---|---|
| JP | 0713894 | * | 2/1995 |
| JP | 9312151 | A2 | 12/1997 |
| JP | 10144287 | A2 | 5/1998 |
| JP | 2001307714 | A2 | 11/2001 |
| JP | 2002110114 | A2 | 4/2002 |
| JP | 2008117586 | * | 5/2008 |
| JP | 2010192270 | A2 | 9/2010 |
| JP | 201486375 | | 5/2014 |

* cited by examiner

[Fig.1A]
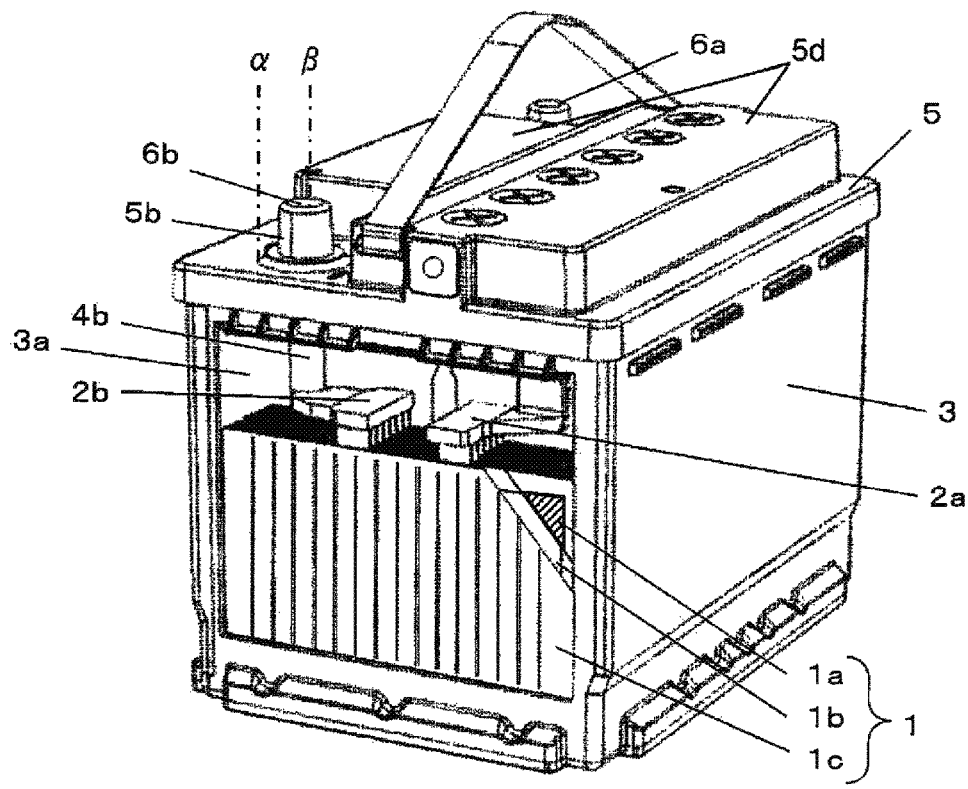
[Fig.1B]
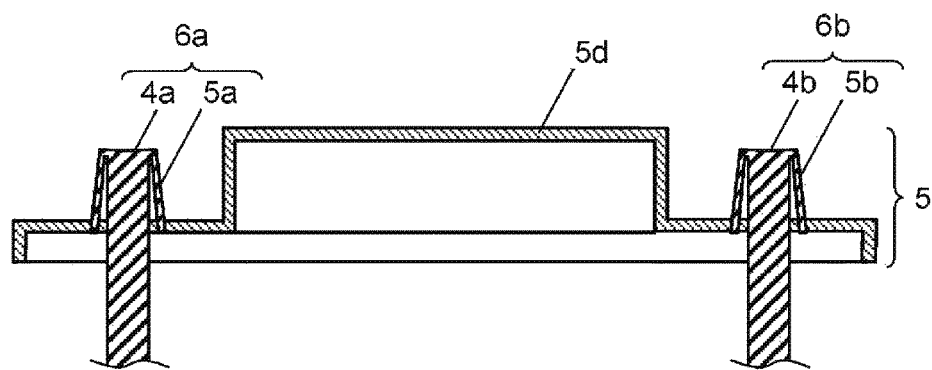

[Fig.2]
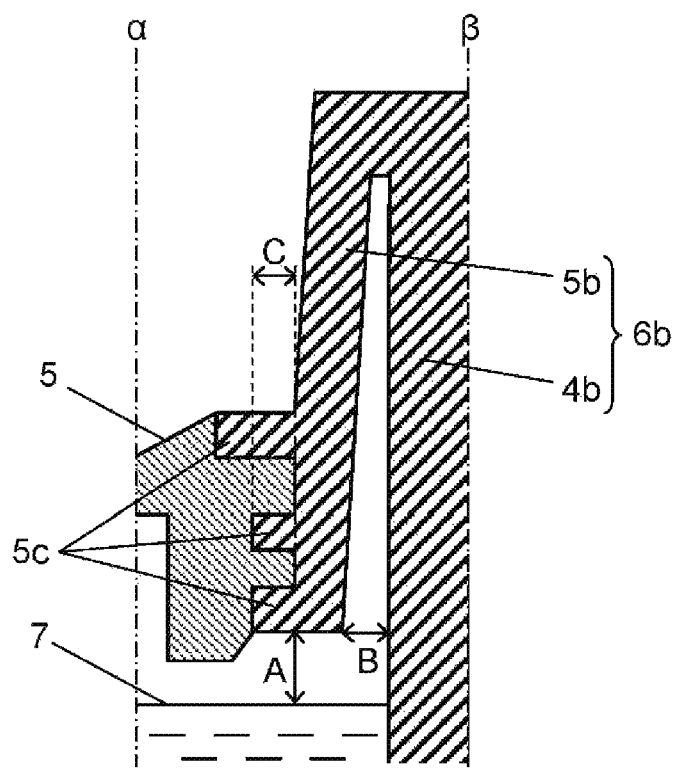
[Fig.3]
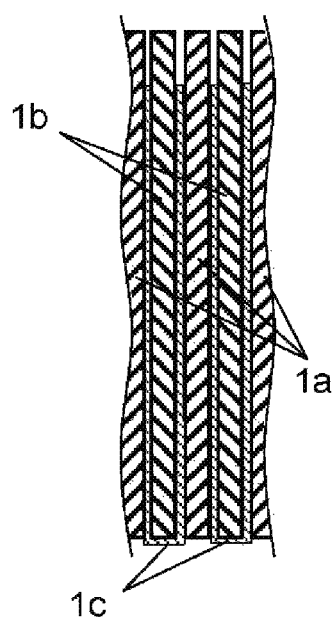

LEAD-ACID BATTERY

TECHNICAL FIELD

The present invention primarily relates to a lead-acid battery for starting an engine.

BACKGROUND ART

A lead-acid battery for starting an engine includes a plurality of electrode plate assemblies, a battery case, positive electrode straps, negative electrode straps, a positive electrode post, a negative electrode post, a cover, and an electrolyte solution. Each electrode plate assembly includes a plurality of positive electrodes, a plurality of negative electrodes, and a plurality of separators interposed therebetween. Each positive electrode strap is connected to the plurality of positive electrodes, and each negative electrode strap are connected to the plurality of negative electrodes. The battery case includes a plurality of cell compartments that receive insertion of the electrode plate assemblies. The positive electrode post is connected to the positive electrode strap in one of the cell compartments that is located at one end, and the negative electrode post is connected to the negative electrode strap in one of the cell compartments that is located at the other end. The cover seals the opening of the battery case, and includes a positive electrode bushing that receives insertion of the positive electrode post and a negative electrode bushing that receives insertion of the negative electrode post. The plurality of electrode plate assemblies are immersed in the electrolyte. A positive electrode terminal is formed by inserting the positive electrode post into the positive electrode bushing to form a unitary structure, and a negative electrode terminal is formed by inserting the negative electrode post into the negative electrode bushing to form a unitary structure.

A gap is provided between the outer circumferential surface of the negative electrode post (or positive electrode post) and the inner circumferential surface of the negative electrode bushing (or positive electrode bushing) in the negative electrode terminal (or positive electrode terminal) so as to enable smooth insertion of the negative electrode post (or positive electrode post) into the negative electrode bushing (or positive electrode bushing). If the gap is provided inattentively, the negative electrode terminal is easily corroded due to deposition of the electrolyte solution.

Patent Literature 1 discloses a configuration in which the gap between the outer surface of the negative electrode post (or positive electrode post) and the inner surface of the negative electrode bushing (or positive electrode bushing) in the negative electrode terminal (or positive electrode terminal) is limited to 1 mm or more. As a result of limiting the gap as described above, the electrolyte solution will not be easily deposited onto the gap, and corrosion can be prevented.

CITATION LIST

Patent Literature

[PTL 1] Laid-Open Utility Model Application Publication No. S60-168264

SUMMARY OF INVENTION

It is an object of the present invention to, in a lead-acid battery in which the distance between the surface of the electrolyte solution and the negative electrode bushing is relatively short and that is devised to achieve a long battery life, avoid a problem of leakage of the electrolyte solution from the periphery of the negative electrode terminal at the end of the battery life.

A lead-acid battery according to the present invention includes an electrode plate assembly, a battery case, a positive electrode strap, a negative electrode strap, a positive electrode post, a negative electrode post, a cover, and an electrolyte solution. The electrode plate assembly includes a plurality of positive electrodes, a plurality of negative electrodes, and a plurality of separators interposed between each of the plurality of positive electrodes and each of the plurality of negative electrodes. The battery case has an opening and includes a cell compartment that houses the electrode plate assembly. The positive electrode strap is connected to the plurality of positive electrodes, and the negative electrode strap is connected to the plurality of negative electrodes. The positive electrode post is connected to the positive electrode strap, and the negative electrode post is connected to the negative electrode strap. The cover seals the opening of the battery case and includes a positive electrode bushing that receives insertion of the positive electrode post and a negative electrode bushing that receives insertion of the negative electrode post. The electrode plate assembly is immersed in the electrolyte solution. The positive electrode post and the positive electrode bushing together constitute a positive electrode terminal, and the negative electrode post and the negative electrode bushing together constitute a negative electrode terminal. A maximum value of a gap between an outer circumferential surface of the negative electrode post and an inner circumferential surface of the negative electrode bushing in the negative electrode terminal is 0.5 mm or more and 2.5 mm or less. A rib is provided in a lower part of the negative electrode bushing, and a minimum value of a protrusion height of the rib is 1.5 mm or more and 4.0 mm or less. A distance between a surface of the electrolyte solution and a lowermost portion of the negative electrode bushing is 15 mm or less.

According to the present invention, in a lead-acid battery in which the distance between the surface of the electrolyte solution and the negative electrode bushing is relatively short and that is devised to achieve a long battery life, it is possible to avoid the problem of leakage of the electrolyte solution from the periphery of the negative electrode terminal of the cover at the end of the battery life.

BRIEF DESCRIPTION OF DRAWINGS

FIG. 1A is a partial perspective view schematically showing a lead-acid battery according to an embodiment of the present invention.

FIG. 1B is a schematic cross-sectional view of a cover of the lead-acid battery shown in FIG. 1A.

FIG. 2 is a schematic diagram showing an example of a major part in the lead-acid battery shown in FIG. 1A.

FIG. 3 is a partial cross-sectional view showing a configuration of an electrode plate assembly included in the lead-acid battery shown in FIG. 1A.

DESCRIPTION OF EMBODIMENTS

Prior to the description of embodiments according to the present invention, a brief description will be given of problems encountered with a conventional lead-acid battery for starting an engine. Mainly in European countries, a lead-acid battery with a cover, most part of which is elevated so as to cover the positive electrode terminal and the negative electrode terminal is widely used use as a battery for starting an engine. Within the elevated portion, the vapor or mist of the electrolyte solution flows back into the cell compartments. On the other hand, mainly in Japan, a lead-acid battery having a protruded positive electrode terminal and a protruded negative electrode terminal is widely used as a battery for starting an engine. In order for the European type lead-acid battery to have the same level of volumetric efficiency as that of the Japanese type lead-acid battery, it is necessary to reduce the dead space formed between the upper surface of the electrode plate assembly and the inner surface of the cover. In this configuration, the surface of the electrolyte solution in which the electrode plate assemblies are immersed naturally comes closer to the negative electrode bushing (or positive electrode bushing). As used herein, the volumetric efficiency refers to a value obtained by dividing the electric capacity of a lead-acid battery by the volume of its housing composed of a cover and a battery case, and the electric capacity of the lead-acid battery can be replaced by the volume of the electrode plate assembly.

The configuration described above is problematic in that the electrolyte solution leaks out from the periphery of the negative electrode terminal of the cover. This problem occurs most pronouncedly in the final stage of use of a battery having a configuration in which a negative electrode is contained in a bag-like separator so as to achieve a long battery life. Even when the negative electrode terminal is devised in a manner as disclosed in Patent Literature 1, this problem cannot be solved.

Patent Literature 1 teaches that by adjusting the gap between the outer circumferential surface of the negative electrode post and the inner circumferential surface of the negative electrode bushing in the negative electrode terminal to 1 mm or more, the electrolyte solution will not be easily deposited onto the gap, and corrosion can be prevented. With this configuration, if there is at least a certain distance between the surface of the electrolyte solution and the lowermost portion of the negative electrode bushing, it is possible to prevent the electrolyte solution from creeping up (this is thought to occur by capillary action) and therefore expect the effect of preventing corrosion. However, in the configuration for improving volumetric efficiency as described above, the distance between the surface of the electrolyte solution and the lowermost portion of the negative electrode bushing is, for example, 15 mm or less. When a lead-acid battery having this configuration is mounted on a vehicle, the lowermost portion of the negative electrode bushing frequently comes into contact with the electrolyte solution due to jolting of the vehicle or the like. Eventually, the electrolyte solution resides in the gap between the negative electrode bushing and the negative electrode post.

On the other hand, lead (Pb) that is present on the surface of the negative electrode post is oxidized into lead oxide (PbO) by oxygen in the atmosphere. A reaction between PbO and the electrolyte solution (dilute sulfuric acid) produces lead sulfate (PbSO4) and water.

The lower the amount of the electrolyte solution residing in the gap between the negative electrode bushing and the negative electrode post, the more significantly the pH value increases after the above-described reaction, which makes it easy for $PbSO_4$ deposited on the negative electrode post and the inner circumferential surface of the negative electrode bushing to elute out. Lead (Pb) in the negative electrode post and the inner circumference of the negative electrode bushing further exposed to the electrolyte solution due to the elution of $PbSO_4$ is reacted and converted into $PbSO_4$. In this way, $PbSO_4$ is repeatedly deposited and dissolved. In the end, a considerable amount of $PbSO_4$ is deposited onto the negative electrode post and the inner circumferential surface of the negative electrode bushing. Since the molar volume of $PbSO_4$ is greater than that of Pb by a factor of about 2.6 (greater than that of PbO by a factor of about 1.3), the negative electrode post and the inner circumference of the negative electrode bushing consequently expand significantly. This will not only close the gap between the negative electrode post and the negative electrode bushing, but also apply a considerable amount of stress onto the negative electrode bushing. The stress causes a crack in the joint portion between the negative electrode bushing and the cover, and the electrolyte solution slips through the crack and leaks out. As described above, with the configuration in which the distance between the surface of the electrolyte solution and the lowermost portion of the negative electrode bushing is short, it is not possible to expect the effect disclosed in Patent Literature 1.

Hereinafter, embodiments of the present invention will be described with reference to the drawings.

Embodiment 1

FIG. 1A is a partial perspective view schematically showing a lead-acid battery according to an embodiment of the present invention. FIG. 1B is a schematic cross-sectional view of a cover 5 of the lead-acid battery. FIG. 2 is a schematic diagram showing a portion between the line α and the line β shown in FIG. 1A. FIG. 3 is a partial cross-sectional view showing a configuration of an electrode plate assembly 1 included in the lead-acid battery shown in FIG. 1A.

A lead-acid battery includes a plurality of electrode plate assemblies 1, a battery case 3, positive electrode straps 2a, negative electrode straps 2b, a positive electrode post 4a, a negative electrode post 4b, a cover 5, and an electrolyte solution (not shown). The electrode plate assemblies 1 each include a plurality of positive electrodes 1a, a plurality of negative electrodes 1b, and a plurality of bag-like separators 1c each containing one negative electrode 1b. Each positive electrode strap 2a is connected to the plurality of positive electrodes 1a so as to bundle the plurality of positive electrodes 1a. Each negative electrode strap 2b is connected to the plurality of negative electrodes 1b so as to bundle the plurality of negative electrodes 1b. The battery case 3 includes a plurality of cell compartments 3a that receive insertion of the electrode plate assemblies 1. The positive electrode post 4a is connected to the positive electrode strap 2a in one of the cell compartments that is located at one end, and the negative electrode post 4b is connected to the negative electrode strap 2b in one of the cell compartments 3a that is located at the other end.

That is, the lead-acid battery includes an equal plural number of electrode plate assemblies 1, positive electrode straps 2a and negative electrode straps 2b. The plurality of electrode plate assemblies 1 are connected in series by every two adjacent ones of the plurality of electrode plate assemblies 1 being connected via the positive electrode straps 2a and the negative electrode straps 2b. One of the plurality of positive electrode straps 2a that is not connected to any one of the negative electrode straps 2b is connected to the positive electrode post 4a, and one of the plurality of negative electrode straps 2b that is not connected to any one of the positive electrode straps 2a is connected to negative electrode post 4b.

The cover 5 seals the opening of the battery case 3, and includes a positive electrode bushing 5a that receives insertion of the positive electrode post 4a and a negative electrode bushing 5b that receives insertion of the negative electrode post 4b. The cover 5 includes an elevated portion 5d. The elevated portion 5d is provided in a portion other than the portion where a positive electrode terminal 6a and a negative electrode terminal 6b are provided. That is, most part of the cover 5 is elevated so as to surround the periphery of the positive electrode terminal 6a and the negative electrode terminal 6b. The electrolyte solution is an electrolyte solution in which the plurality of electrode plate assemblies 1 are immersed. The positive electrode terminal 6a is formed by inserting the positive electrode post 4a into the positive electrode bushing 5a to form a unitary structure, and the negative electrode terminal 6b is formed by inserting the negative electrode post 4b into the negative electrode bushing 5b to form a unitary structure.

As shown in FIG. 2, in this lead-acid battery, a distance A between an electrolyte solution surface 7 and a lowermost portion of the negative electrode bushing 5b is 15 mm or less. Also, as shown in FIG. 3, based on the assumption that the lead-acid battery has a configuration in which each bag-like separator 1c contains one negative electrode 1b, a maximum value B of a gap between an outer circumferential surface of the negative electrode post 4b and an inner circumferential surface of the negative electrode bushing 5b in the negative electrode terminal 6b is 0.5 mm or more and 2.5 mm or less. A minimum value C of a protrusion height of a rib 5c provided in a lower part of the negative electrode bushing 5b is 1.5 mm or more and 4.0 mm or less.

If the maximum value B of the gap between the outer circumferential surface of the negative electrode post 4b and the inner circumferential surface of the negative electrode bushing 5b in the negative electrode terminal 6b is 0.5 mm or more, the gap allows the expansion of the negative electrode post 4b, and thus the deformation of the negative electrode bushing 5b can be suppressed. If, on the other hand, the maximum value B is 2.5 mm or less, an excessive drop in vibration resistance can be avoided.

Meanwhile, if the minimum value C of the height of the rib 5c provided in a lower part of the negative electrode bushing 5b is 1.5 mm or more, it is possible to bring the rib 5c and the body of the cover 5 into firm contact with each other. For this reason, even if $PbSO_4$ is produced between the negative electrode post 4b and the negative electrode bushing 5b, and the negative electrode post 4b and the negative electrode bushing 5b expand to apply a stress on the negative electrode bushing 5b, it is possible to suppress the occurrence of a crack through which the electrolyte solution leaks out. If, on the other hand, the minimum value C is 4.0 mm or less, the productivity of the negative electrode bushing 5b can be maintained at a high level, enabling production at a good yield.

By satisfying the above-described two conditions, in the configuration of the present embodiment, it is possible to avoid damage to the cover 5 that occurs most pronouncedly in the final stage of use.

The reason that a long battery life is achieved as a result of a negative electrode 1b being contained in a bag-like separator 1c will be described in detail. Corrosion and expansion of a grid serving as a current collector for an electrode are more likely to take place in the positive electrode 1a than in the negative electrode 1b. For this reason, if a positive electrode 1a is contained in a bag-like separator 1c, the grid of the positive electrode 1a corroded or expanded by repetition of charge and discharge causes damage to the bottom portion of the bag-like separator 1c. With the damaged portion serving as a start point, a part of the grid of the positive electrode 1a comes into contact with the negative electrode 1b, causing an internal short-circuit, as a result of which the lead-acid battery reaches its battery life in an early stage. On the other hand, the grid of the negative electrode 1b is unlikely to undergo corrosion and expansion. For this reason, by containing a negative electrode 1b in a bag-like separator 1c, damage to the separator 1c is prevented, making it difficult for an internal short-circuit to occur, as a result of which the battery life of the lead-acid battery can be extended. For this reason, an electrode plate assembly 1 is configured by alternately arranging positive electrodes 1a and negative electrodes 1b, with each negative electrode 1b being contained in a bag-like separator 1c as shown in FIG. 3.

The positive electrode post 4a, the negative electrode post 4b, the positive electrode bushing 5a, and the negative electrode bushing 5b can be formed by using a lead-based alloy containing Sb. For example, the positive electrode post 4a is inserted into the positive electrode bushing 5a, and thereafter their top surface is welded with a burner to form the positive electrode post 4a and the positive electrode bushing 5a into a unitary structure. In this way, the positive electrode terminal 6a can be formed. The same method can be used to form the negative electrode terminal 6b by forming the negative electrode post 4b and the negative electrode bushing 5b into a unitary structure.

The effects of the present embodiment will be described next in detail by way of specific examples.

(1) Production of Lead-Acid Battery

Lead-acid battery samples used in the following evaluation tests are lead-acid batteries of BSEN5 0342-2-2007 (LN3 type) according to the EN standard. Detailed specifications are as shown in Table 1, and an overview is as follows.

First, the production process of an electrode plate assembly 1 commonly used for each sample will be described.

A paste was prepared by kneading a lead oxide powder with sulfuric acid and purified water. The prepared paste was applied to positive electrode grids made of a Pb—Sn alloy containing Ca so as to produce positive electrodes 1a.

Meanwhile, a past was prepared by adding an organic additive and the like to a lead oxide powder and kneading the mixture with sulfuric acid and purified water. The prepared paste was applied to negative electrode grids made of a Pb—Sn alloy containing Ca so as to produce negative electrodes 1b.

The positive electrodes 1a and the negative electrodes 1b produced in the manner described above were aged and dried, and thereafter, each negative electrode 1b was contained in a bag-like separator made of polyethylene. The negative electrodes 1b and the positive electrode 1a were alternately arranged to produce an electrode plate assembly 1 in which eight positive electrodes 1a and nine negative electrodes 1b were alternately stacked with separators 1c interposed therebetween.

The current collecting portions of the positive electrodes 1a housed in the same cell compartment 3a were bundled by a positive electrode strap 2a made of Pb—Sb, and the current collecting portions of the negative electrodes 1b were bundled by a negative electrode strap 2b made of Pb—Sn. With respect to two electrode plate assemblies 1 housed in the next adjacent cell compartments 3a, the positive electrode strap 2a of one of the two electrode plate assemblies 1 was connected to the negative electrode strap 2b of the other electrode plate assembly 1 so as to connect the two electrode plate assemblies 1 in series. The same operation was performed on all (six) electrode plate assemblies 1 so as to connect all of the electrode plate assemblies 1 in series. Then, with respect to the plurality of aligned cell compartments 3a, the positive electrode strap 2a connected to the electrode plate assembly 1 housed in the cell compartment 3a that was located at one end was connected to a positive electrode post 4a made of Pb—Sb. On the other hand, the negative electrode strap 2b connected to the electrode plate assembly 1 housed in the cell compartment 3a that was located at the other end was connected to a negative electrode post 4b made of Pb—Sb.

At the time of sealing the opening of the battery case 3 by using a cover 5, the positive electrode post 4a was inserted into a positive electrode bushing 5a made of Pb—Sb. On the other hand, the negative electrode post 4b was inserted into a negative electrode bushing 5b made of Pb—Sb. Then, the positive electrode post 4a and the positive electrode bushing 5a were formed into a unitary structure by burner welding, and the negative electrode post 4b and the negative electrode bushing 5b were also formed into a unitary structure by burner welding. Furthermore, an electrolyte solution made of dilute sulfuric acid was poured into the battery case 3, which was then subjected to a formation process. Then, finally, lead-acid battery samples 1A to 1N were produced in which the density of the electrolyte solution was 1.28 g/cm$^3$, and the distance A between the electrolyte solution surface 7 and the lowermost portion of the negative electrode bushing 5b was 6 mm.

Note that the shape of the negative electrode bushing 5b was varied such that the maximum value B of the gap between the outer circumferential surface of the negative electrode post 4b and the inner circumferential surface of the negative electrode bushing 5b in the negative electrode terminal 6b and the minimum value C of the protrusion height of the rib 5c satisfied a plurality of conditions shown in Table 1. Note also that the evaluation tests were not performed on samples having negative electrode bushings 5b in which the minimum value C of the protrusion height of the rib 5c was above 4.0 mm because the ribs 5c were not molded as designed.

(2) Life Durability Test (for Checking the Occurrence of Electrolyte Leakage in the Cover 5)

In this test, each sample was subjected to 8000 cycles of charge and discharge in an environment at 75° C., in each of which the sample was discharged at 25 A for one minute and thereafter subjected to constant voltage charge at 14.8 V for 10 minutes. After that, confirmation was made that the voltage 5 seconds after the start of discharge at 582 A was 7.2 V or more (that is, the sample had a sufficient long battery life), and then the state of the periphery of the negative electrode terminal 6b of the cover 5 was evaluated. A rating of "EX" was given when there was no change in terms of the external appearance and the texture, a rating of "GD" was given when there was no change in terms of the external appearance but there was a slight deformation in terms of the texture, a rating of "OK" was given when there was a change in terms of the external appearance such as whitening, a rating of "NG" was given when there was a crack in the joint area between the negative electrode bushing 5b and the body of the cover 5, and there was a leakage of the electrolyte solution. The evaluation results are shown in Table 1.

(3) Vibration Resistance Test (for Checking the Endurance of the Negative Electrode Post 4b)

In this test, each fully charged sample was vibrated in a direction parallel to the short-side surfaces of the battery case 3 for 240 minutes under the following conditions: a rate of acceleration of 29.4 m/s$^2$ and a frequency of 33 Hz while the sample was subjected to constant current discharge at 11.0 A. The time immediately after the start of discharge until the above-described constant current discharge (11.0 A) was no longer performed is shown in Table 1 as a measure of vibration resistance. In Table 1, ">240" indicates that discharge was still possible even after the elapse of 240 minutes.

TABLE 1

| Sample | Maximum value B (mm) | Minimum value C (mm) | Results of life durability test | Results of vibration resistance test (min.) |
|--------|----------------------|----------------------|--------------------------------|---------------------------------------------|
| 1A | 0.3 | 2.0 | NG | >240 |
| 1B | 0.5 | 2.0 | OK | >240 |
| 1C | 1.0 | 2.0 | GD | >240 |
| 1D | 1.5 | 2.0 | EX | >240 |
| 1E | 2.0 | 2.0 | EX | 180 |
| 1F | 2.5 | 2.0 | EX | 135 |
| 1G | 2.8 | 2.0 | EX | 40 |
| 1H | 1.5 | 1.3 | NG | >240 |
| 1J | 1.5 | 1.5 | OK | >240 |
| 1K | 1.5 | 1.8 | GD | >240 |
| 1L | 1.5 | 2.0 | EX | >240 |
| 1M | 1.5 | 3.0 | EX | >240 |
| 1N | 1.5 | 4.0 | EX | >240 |

First, consideration is given to the maximum value B of the gap between the outer circumferential surface of the negative electrode post and the inner circumferential surface of the negative electrode bushing in the negative electrode terminal.

With respect to sample 1A in which the value B was less than 0.5 mm, in the life durability test, a crack occurred in the joint area between the negative electrode bushing and the body of the cover, and the electrolyte solution leaked out. The reason is that the gap was not large enough to allow the expansion of the negative electrode post caused by corrosion.

On the other hand, with respect to sample 1G in which the value B was above 2.5 mm, a good result was obtained in the life durability test, but the vibration resistance was low. The reason is presumably that as a result of the gap B between the negative electrode post and the negative electrode bushing being increased, the negative electrode post swayed significantly when the sample was vibrated.

With respect to samples 1E, 1F and 1G that were discharged only for a period less than 240 minutes in the vibration resistance test, the top surface of the negative electrode terminal, which is the area where the negative electrode post and the negative electrode bushing are fixed, undergone fatigue fracture, and disconnection occurred. From the results described above, it can be seen that the maximum value B of the gap between the outer circumferential surface of the negative electrode post 4b and the inner circumferential surface of the negative electrode bushing 5b in the negative electrode terminal 6b needs to be 0.5 mm or more and 2.5 mm or less.

Next, consideration is given to the minimum value C of the protrusion height of the rib provided in a lower part of the negative electrode bushing.

With respect to sample 1H in which the value C was less than 1.5 mm, in the life durability test, a crack occurred in the joint area between the negative electrode bushing and the body of the cover, and the electrolyte solution leaked out. The reason is presumably that the protrusion height of the rib was too low to ensure a contact area enough to bring the rib and the body of the cover into firm contact with each other.

For this reason, the negative electrode post expanded to apply a stress onto the negative electrode bushing, creating a crack through which the electrolyte solution leaked out.

On the other hand, as described above, when the minimum value C of the protrusion height of the rib is above 4.0 mm, the productivity of the negative electrode bushing decreases. The reason is presumably that as a result of the rib having an excessively large height, the shape of the negative electrode bushing becomes complicated, which makes it difficult for a lead-based alloy molten during casting to flowing into a mold. From the results described above, it can be seen that the minimum value C of the height of the rib $5c$ provided in a lower part of the negative electrode bushing $5b$ needs to be 1.5 mm or more and 4.0 mm or less.

With respect a sample having a configuration in which the negative electrode $1b$ was not contained in the bag-like separator $1c$ (for example, the positive electrode $1a$ was contained in the bag-like separator $1c$), in the life durability test, the voltage 5 seconds after the start of discharge at 582 A after repetition of the above-described cycle 8000 times did not reach 7.2 V, which means the sample had a short battery life. For this reason, the subsequent evaluation test was not performed.

Embodiment 2

In Embodiment 1, the electrode plate assembly 1 is configured by containing the negative electrode $1b$ in the bag-like separator $1c$ as shown in FIG. 3 so as to achieve a long battery life of the lead-acid battery. In contrast, in the present embodiment, the electrode plate assembly 1 is configured by using a greater number of positive electrodes $1a$ than the number of negative electrodes $1b$, so as to achieve a long battery life of the lead-acid battery. Other than the above, the configuration is the same as that of Embodiment 1. That is, the relationship between the number X of positive electrodes $1a$ and the number Y of negative electrodes $1b$ satisfies X≥Y.

A detailed description will be given of the reason that a long battery life of the lead-acid battery can be achieved by configuring the electrode plate assembly 1 as described above. An electrode reaction in the lead-acid battery takes place primarily in a surface of the positive electrode $1a$ that opposes the negative electrode $1b$ via the separator $1c$. In the case of a configuration in which the number Y of negative electrodes $1b$ is changed with the number X of positive electrodes $1a$, which regulates the capacity of the lead-acid battery, being fixed, if X<Y, all surfaces of the positive electrodes $1a$ can contribute to the electrode reaction. However, if X=Y, because the number of surfaces that oppose the negative electrode $1b$ is reduced by one, the number of effective surfaces will be 2X−1. If X>Y, the number of surfaces that oppose the negative electrode $1b$ is reduced by two, the number of effective surfaces will be 2X−2.

Sulfuric acid ($H_2SO_4$) is produced in the effective surfaces of the positive electrodes $1a$ and the negative electrodes $1b$ during charge. However, if the number of effective surfaces is small, sulfuric acid is not uniformly dispersed in the electrolyte solution and thus selectively accumulates in the vicinity of the effective surfaces where sulfuric acid is highly concentrated. As a result, the excitation voltage of the electrode reaction increases. For this reason, the difference between the voltage set for constant voltage charge and the excitation voltage will be relatively small, which makes it difficult for charge current to flow. Thus, the amount of electricity consumed in an overcharge reaction that causes corrosion of the positive electrode $1a$ will also be relatively reduced. Consequently, the corrosion of the positive electrodes $1a$ is suppressed, and the battery life of the lead-acid battery can be extended.

The effects of the present embodiment will be described in detail next by way of specific examples.

(1) Production of Lead-Acid Battery

Lead-acid battery samples used in the following evaluation tests are also lead-acid batteries of BSEN5 0342-2-2007 (LN3 type) according to the EN standard. Detailed specifications are as shown in Table 2, and the overview is the same as Embodiment 1 except for the configuration of the electrode plate assembly.

That is, in the present embodiment, positive electrodes $1a$ and negative electrodes $1b$ were produced in the same manner as in Embodiment 1. Then, the positive electrode $1a$ and the negative electrode $1b$ were aged and dried, and thereafter, the positive electrodes $1a$ and the negative electrodes $1b$ were stacked with polyethylene separators $1c$ interposed therebetween to produce an electrode plate assembly 1. The number X of positive electrodes $1a$ and the number Y of negative electrodes $1b$ was as shown in Table 2. Subsequently, lead-acid battery samples 2A to 2Z were produced in the same manner as in Embodiment 1.

In the present embodiment as well, the shape of the negative electrode bushing $5b$ was varied such that the maximum value B of the gap between the outer circumferential surface of the negative electrode post $4b$ and the inner circumferential surface of the negative electrode bushing $5b$ in the negative electrode terminal $6b$ and the minimum value C of the protrusion height of the rib $5c$ satisfied a plurality of conditions shown in Table 2. Also, the evaluation tests were not performed on samples having negative electrode bushings $5b$ in which the minimum value C of the protrusion height of the rib $5c$ was above 4.0 mm because the ribs $5c$ were not molded as designed.

(2) Life Durability Test

Each sample was evaluated under the same conditions as in Embodiment 1. The results are shown in Table 2.

(3) Vibration Resistance Test

Each sample was evaluated under the same conditions as in Embodiment 1. The results are shown in Table 2.

TABLE 2

| Sample | Number of positive electrodes | Number of negative electrodes | Maximum value B (mm) | Minimum value C (mm) | Results of life durability test | Results of vibration resistance test (min.) |
|---|---|---|---|---|---|---|
| 2A | 8 | 8 | 0.3 | 2.0 | NG | >240 |
| 2B | 8 | 8 | 0.5 | 2.0 | OK | >240 |
| 2C | 8 | 8 | 1.0 | 2.0 | GD | >240 |
| 2D | 8 | 8 | 1.5 | 2.0 | EX | >240 |
| 2E | 8 | 8 | 2.0 | 2.0 | EX | 180 |
| 2F | 8 | 8 | 2.5 | 2.0 | EX | 135 |
| 2G | 8 | 8 | 2.8 | 2.0 | EX | 40 |

TABLE 2-continued

| Sample | Number of positive electrodes | Number of negative electrodes | Maximum value B (mm) | Minimum value C (mm) | Results of life durability test | Results of vibration resistance test (min.) |
|---|---|---|---|---|---|---|
| 2H | 8 | 8 | 1.5 | 1.3 | NG | >240 |
| 2I | 8 | 8 | 1.5 | 1.5 | OK | >240 |
| 2J | 8 | 8 | 1.5 | 1.8 | GD | >240 |
| 2K | 8 | 8 | 1.5 | 2.0 | EX | >240 |
| 2L | 8 | 8 | 1.5 | 3.0 | EX | >240 |
| 2M | 8 | 8 | 1.5 | 4.0 | EX | >240 |
| 2N | 8 | 7 | 0.3 | 2.0 | NG | >240 |
| 2O | 8 | 7 | 0.5 | 2.0 | OK | >240 |
| 2P | 8 | 7 | 1.0 | 2.0 | GD | >240 |
| 2Q | 8 | 7 | 1.5 | 2.0 | EX | >240 |
| 2R | 8 | 7 | 2.0 | 2.0 | EX | 180 |
| 2S | 8 | 7 | 2.5 | 2.0 | EX | 135 |
| 2T | 8 | 7 | 2.8 | 2.0 | EX | 40 |
| 2U | 8 | 7 | 1.5 | 1.3 | NG | >240 |
| 2V | 8 | 7 | 1.5 | 1.5 | OK | >240 |
| 2W | 8 | 7 | 1.5 | 1.8 | GD | >240 |
| 2X | 8 | 7 | 1.5 | 2.0 | EX | >240 |
| 2Y | 8 | 7 | 1.5 | 3.0 | EX | >240 |
| 2Z | 8 | 7 | 1.5 | 4.0 | EX | >240 |

First, consideration is given to the maximum value B of the gap between the outer circumferential surface of the negative electrode post and the inner circumferential surface of the negative electrode bushing in the negative electrode terminal.

With respect to sample 2A in which the value B was less than 0.5 mm, in the life durability test, a crack occurred in the joint area between the negative electrode bushing and the body of the cover, and the electrolyte solution leaked out. The reason is that the gap was not large enough to allow the expansion of the negative electrode post caused by corrosion.

On the other hand, with respect to sample 2G in which the value B was above 2.5 mm, a good result was obtained in the life durability test, but the vibration resistance was low. The reason is presumably that as a result of the gap B between the negative electrode post and the negative electrode bushing being increased, the negative electrode post swayed significantly when the sample was vibrated.

With respect to samples 2E, 2F and 2G that were discharged only for a period less than 240 minutes in the vibration resistance test, the top surface of the negative electrode terminal, which is the area where the negative electrode post and the negative electrode bushing are fixed, undergone fatigue fracture, and disconnection occurred. From the results described above, it can be seen that the maximum value B of the gap between the outer circumferential surface of the negative electrode post 4b and the inner circumferential surface of the negative electrode bushing 5b in the negative electrode terminal 6b needs to be 0.5 mm or more and 2.5 mm or less.

Next, consideration is given to the minimum value C of the protrusion height of the rib provided in a lower part of the negative electrode bushing.

With respect to sample 2H in which the value C was less than 1.5 mm, in the life durability test, a crack occurred in the joint area between the negative electrode bushing and the body of the cover, and the electrolyte solution leaked out. The reason is presumably that the protrusion height of the rib was too low to ensure a contact area enough to bring the rib and the body of the cover into firm contact with each other. For this reason, the negative electrode post expanded to apply a stress onto the negative electrode bushing, creating a crack through which the electrolyte solution leaked out.

On the other hand, as described above, when the minimum value C of the protrusion height of the rib is above 4.0 mm, the productivity of the negative electrode bushing decreases. The reason is presumably that as a result of the rib having an excessively large height, the shape of the negative electrode bushing becomes complicated, which makes it difficult for a lead-based alloy molten during casting to flowing into a mold. From the results described above, it can be seen that the minimum value C of the height of the rib 5c provided in a lower part of the negative electrode bushing 5b needs to be 1.5 mm or more and 4.0 mm or less.

Next, consideration is given to the case where the relationship between the number X of positive electrodes 1a and the number Y of negative electrodes 1b is different (X=Y or X>Y). With respect to samples 2A to 2M in which the relationship satisfied X=Y and samples 2N to 2Z in which the relationship satisfied X>Y, there is no change in the tendency of the results of the life durability test and the vibration resistance test. From the results described above, it can be seen that the samples having a configuration in which the relationship between the number X of positive electrodes 1a and the number Y of negative electrode 1b satisfies X≥Y so as to achieve a long battery life show a similar tendency.

With respect to a sample having a configuration in which the relationship between the number X of positive electrodes 1a and the number Y of negative electrodes 1b satisfied X<Y, in the life durability test, the voltage 5 seconds after the start of discharge at 582 A after repetition of the above-described cycle 8000 times did not reach 7.2 V, which means the sample had a short battery life. For this reason, the subsequent evaluation test was not performed.

Although preferred embodiments of the present invention have been described above, the above description does not constitute limitations and various modifications are of course possible. As an example, if the distance A between the electrolyte solution surface 7 and the lowermost portion of the negative electrode bushing 5b is 15 mm or less, it is needless to say that results having a similar tendency to those of Embodiments 1 and 2 are obtained. Alternatively, the bag-like separator 1c according to Embodiment 1 may be combined with the relationship between the number X of positive electrodes 1a and the number Y of negative electrodes 1b according to Embodiment 2.

In the description given above, the battery case 3 contains a plurality of electrode plate assemblies 1, but may contain only one electrode plate assembly 1.

INDUSTRIAL APPLICABILITY

The present invention is particularly useful in a lead-acid battery for starting an engine.

REFERENCE SIGNS LIST

1 Electrode Plate Assembly
1a Positive Electrode
1b Negative Electrode
1c Separator
2a Positive Electrode Strap
2b Negative Electrode Strap
3 Battery Case
3a Cell Compartment
4a Positive Electrode Post
4b Negative Electrode Post
5 Cover
5a Positive Electrode Bushing
5b Negative Electrode Bushing
5c Rib
5d Elevated Portion
6a Positive Electrode Terminal
6b Negative Electrode Terminal
7 Electrolyte Solution Surface

The invention claimed is:

1. A lead-acid battery comprising:
   an electrode plate assembly including a plurality of positive electrodes, a plurality of negative electrodes, and a plurality of separators interposed between each of the plurality of positive electrodes and each of the plurality of negative electrodes;
   a battery case having an opening and including a cell compartment that houses the electrode plate assembly;
   a positive electrode strap connected to the plurality of positive electrodes;
   a negative electrode strap connected to the plurality of negative electrodes;
   a positive electrode post connected to the positive electrode strap;
   a negative electrode post connected to the negative electrode strap;
   a cover that seals the opening of the battery case and includes a positive electrode bushing that receives insertion of the positive electrode post and a negative electrode bushing that receives insertion of the negative electrode post; and
   an electrolyte solution in which the electrode plate assembly is immersed,
   wherein the positive electrode post and the positive electrode bushing together constitute a positive electrode terminal, and the negative electrode post and the negative electrode bushing together constitute a negative electrode terminal,
   a rib is provided in a lower part of the negative electrode bushing,
   a maximum value of a gap between an outer circumferential surface of the negative electrode post and an inner circumferential surface of the negative electrode bushing in the negative electrode terminal is 0.5 mm or more and 2.5 mm or less,
   a minimum value of a protrusion height of the rib is 1.5 mm or more and 4.0 mm or less, and
   a distance between a surface of the electrolyte solution and a lowermost portion of the negative electrode bushing is 15 mm or less.

2. The lead-acid battery in accordance with claim 1, wherein the plurality of separators each have a bag-like shape and contain the plurality of negative electrodes, respectively.

3. The lead-acid battery in accordance with claim 1, wherein a number of the positive electrodes is greater than a number of the negative electrodes.

4. The lead-acid battery in accordance with claim 1, wherein the lead-acid battery includes an equal plural number of the electrode plate assemblies, the positive electrode straps and the negative electrode straps,
   the battery case includes a plural number of the cell compartments that contain the plural number of the electrode plate assemblies, respectively,
   the plural number of the electrode plate assemblies are connected in series by every two adjacent ones of the plural number of the electrode plate assemblies being connected in series via the positive electrode straps and the negative electrode straps,
   one of the plural number of the positive electrode straps that is not connected to any one of the negative electrode straps is connected to the positive electrode post, and
   one of the plural number of the negative electrode straps that is not connected to any one of the positive electrode straps is connected to the negative electrode post.

5. The lead-acid battery in accordance with claim 1, wherein a portion of the cover other than a portion where the positive electrode terminal and the negative electrode terminal are provided is elevated.

* * * * *